June 28, 1938. L. I. LOUVIAUX 2,122,258
CUTTING TABLE
Filed Sept. 6, 1935 2 Sheets-Sheet 1
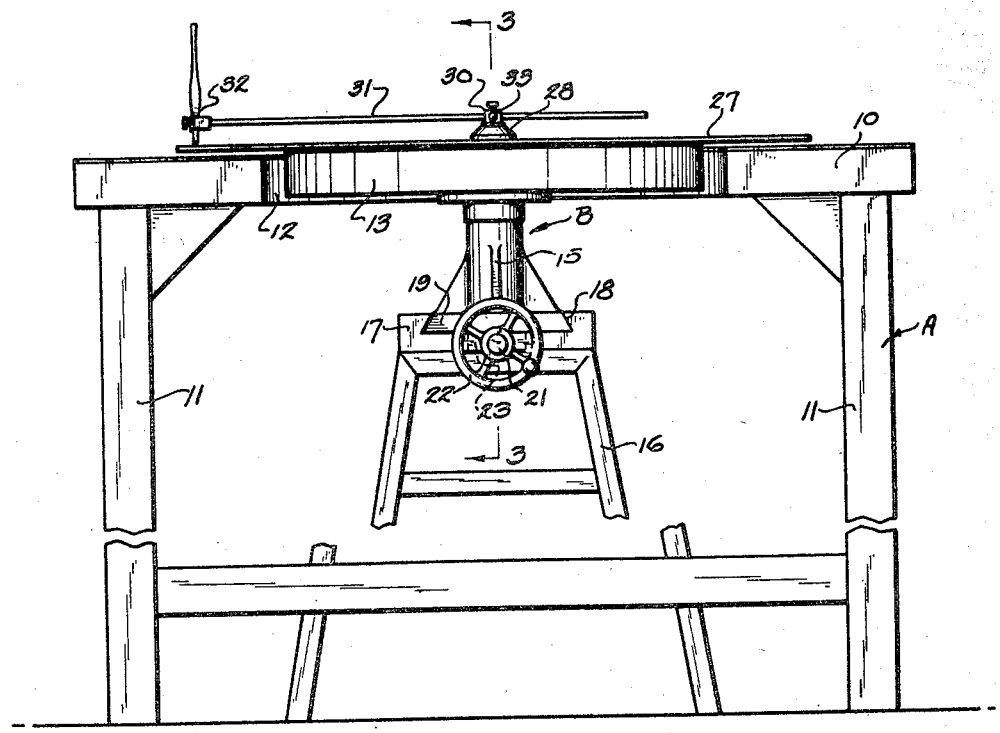
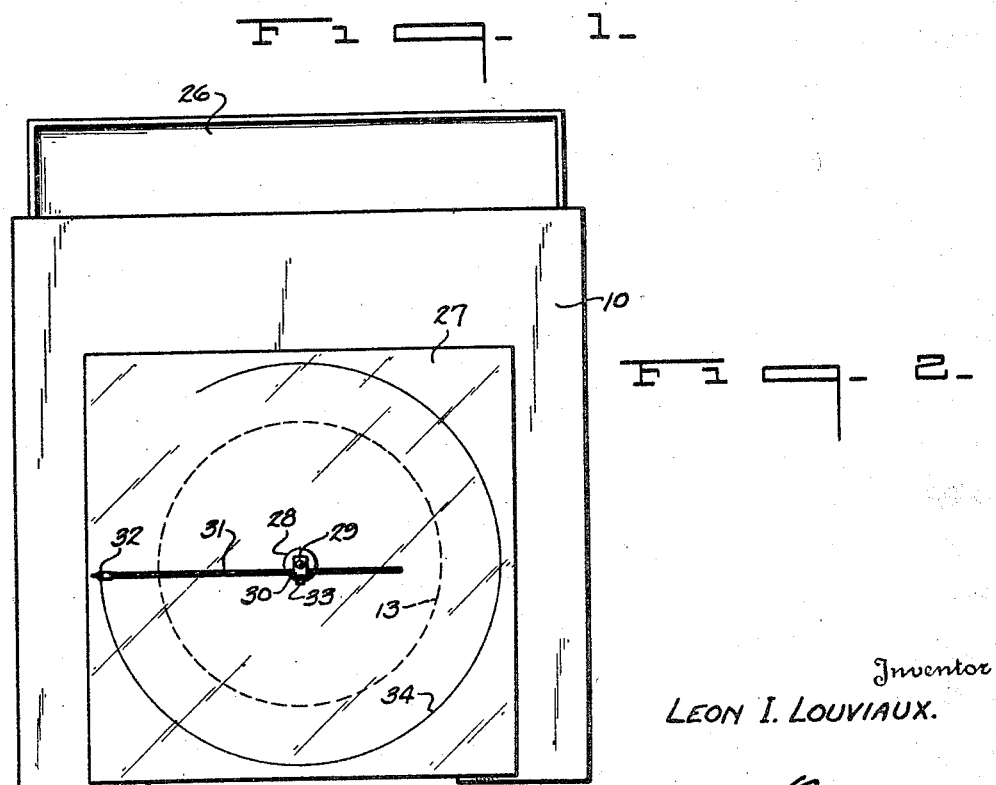
Inventor
LEON I. LOUVIAUX.
By Frank Fraser
Attorney June 28, 1938.  L. I. LOUVIAUX  2,122,258
CUTTING TABLE
Filed Sept. 6, 1935   2 Sheets-Sheet 2
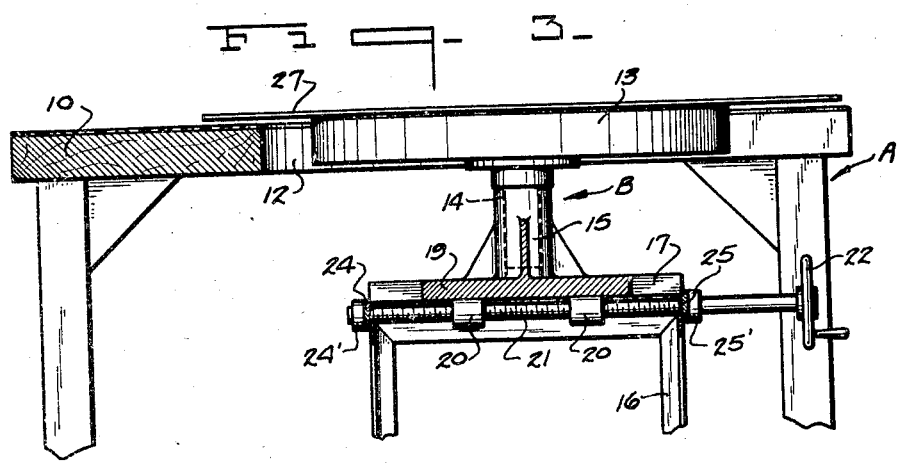
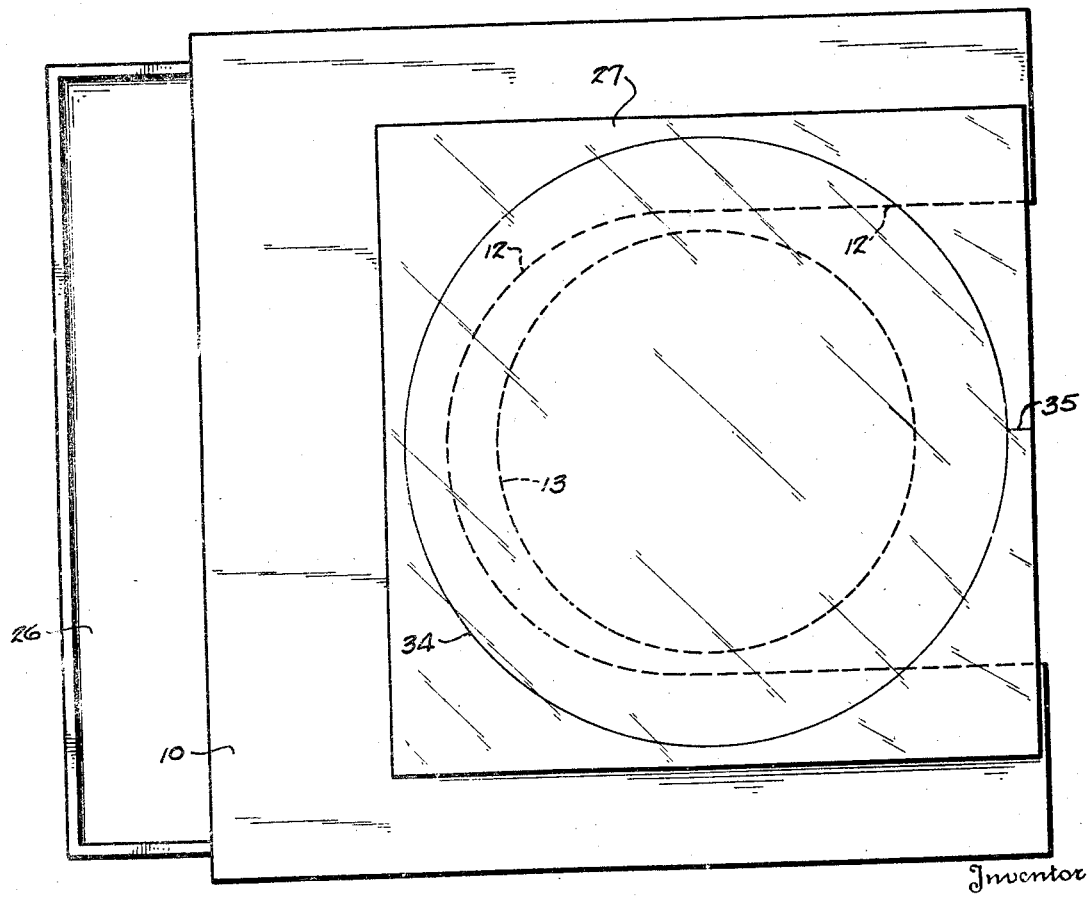
Inventor
LEON I. LOUVIAUX.
By Frank Fraser
Attorney Patented June 28, 1938

2,122,258

UNITED STATES PATENT OFFICE 2,122,258

CUTTING TABLE

Leon I. Louviaux, Toledo, Ohio, assignor to Libbey-Owens-Ford Glass Company, Toledo, Ohio, a corporation of Ohio Application September 6, 1935, Serial No. 39,369

2 Claims. (Cl. 49—48)

This invention relates broadly to the art of glass cutting and more particularly to improvements in apparatus for use in the cutting of flat sheets or plates.

The principal aim and object of the invention is the provision of an improved form of table for supporting the glass sheets during the cutting operation and by the use of which the cutting of circular sections or odd shapes from the sheets or plates may be carried out in a rapid, convenient and economical manner.

Another important object of the invention is the provision of an improved form of cutting table which will greatly facilitate and expedite the breaking of the glass sheets after they have been scored and in such a manner that the liability of scratching the glass incident to such breaking is reduced to a minimum if not entirely eliminated.

Other objects and advantages of the invention will become more apparent during the course of the following description when taken in connection with the accompanying drawings.

In the drawings wherein like numerals are employed to designate like parts throughout the same, Fig. 1 is a front view of a cutting table constructed in accordance with the present invention, Fig. 2 is a plan view thereof, Fig. 3 is a vertical section taken substantially on line 3—3 of Fig. 1, and Fig. 4 is an enlarged plan view of the cutting table with the cutting means removed.

With reference to the drawings, the cutting table herein provided includes generally a stationary portion or section A and a revolving portion or section B. The stationary table section A comprises a flat horizontal top 10 supported by legs 11 braced in any desired manner. The top 10 is formed with a relatively large, substantially U-shaped opening 12 facing to the front of the table and into which fits the flat horizontal circular top 13 of the revolving table section B. The top 13 of the revolving table section B is positioned slightly above the level of the top 10 of stationary table section A and this arrangement constitutes a very important feature of the invention.

The circular top 13 of the revolving table section B is carried at the upper end of a vertical shaft 14 rotatably mounted in a hollow standard 15 supported upon a suitable framework 16. Provision is made for moving the revolving table top 13 back and forth in the U-shaped opening 12 in stationary table top 10 and to this end there is carried upon the upper end of the supporting framework 16 a guide block 17 having an undercut groove or channel 18 within which is slidably received the base plate 19 formed at the lower end of standard 15.

The base plate 19 is provided upon its under surface with spaced bearings 20 through which is threaded a horizontal screw 21 carrying at its forward end a hand wheel 22. The bearings 20 are received within an opening 23 which extends longitudinally of the block 17. The screw 21 passes longitudinally through this opening and also loosely through plates 24 and 25 carried at the opposite ends of said block. Fixed upon the screw outwardly of the plates 24 and 25 are collars 24' and 25' respectively which, while permitting rotation of the screw, prevent longitudinal movement thereof. Consequently, upon turning of the hand wheel 22, the base plate 19 can be moved longitudinally along the screw 21, thereby causing the top 13 of the revolving table section to be moved forwardly or rearwardly within the U-shaped opening 12 in stationary table top 10.

Positioned at the rear of the stationary table section A is a box or trough 26 which is adapted to receive the waste or cullet cut from the glass sheet as will be more clearly hereinafter described.

In practice, the glass sheet 27 to be cut is laid upon the top 13 of the revolving table section so that the forward edge thereof is substantially flush with the front edge of the top 10 of the stationary table section and the revolving top 13 can be moved forward or backward in the U-shaped opening 12 depending upon the size of glass sheet being cut. When the glass sheet is laid upon the revolving top 13, it overhangs or overlies the stationary top 10 but does not contact therewith due to the fact that the top 10 is positioned slightly below the level of top 13. After the sheet has been properly positioned for cutting, a circular section or any other odd shape may be cut therefrom, and this cutting may be accomplished by the use of any suitable cutting apparatus.

There is illustrated in the drawings, by way of example, the cutting of a circular section or disc from the glass sheet and the cutting means herein provided for this purpose includes a circular base 28 provided with a vertical stud 29 upon which is revolvably mounted a block 30. This block is formed with a horizontal opening through which is inserted a horizontal radius bar 31 secured in proper position by a thumb screw 33 and carrying at its outer end a conventional hand cutter 32. The radius bar 31 can be adjusted longitudinally within the block 30 depending upon the size of disc to be cut.

In cutting the glass sheet 27, it is first properly positioned upon the revolving table top 13 as explained above after which the base 20 of the cutting means is placed upon the sheet at approximately the center thereof and the operator, while holding the base from slipping with one hand, swings the cutting tool 32 with the other hand in a circle upon stud 29 to effect the scoring of the glass as indicated at 34. After the circular cut 34 has been made, the cutting apparatus is removed and the operator then makes a lateral cut 35 to the forward edge of the sheet. The breaking of the sheet to remove the waste or cullet is then effected by breaking the glass first along the lateral score line 35 and in then exerting a slight downward pressure on the glass outwardly of the circular score line 34, while simultaneously revolving the sheet. The waste glass upon breaking away from the sheet will be received and supported upon the stationary table top 10 and the operator can then push the waste glass rearwardly across the top into the cullet box 26.

Due to the fact that the revolving table top 13 is positioned at a slightly higher level than the stationary table top 10 eliminates the sliding of the glass over the table during the breaking thereof as is necessary when using a solid top stationary table and which sliding movement has heretofore resulted in many fine scratches in the glass. With the improved type of table herein provided, the glass sheet is not moved relative to the table until the cullet has been completely broken away so that it is impossible for the sheet to be scratched. Among the advantages to be gained by the use of the stationary table section in conjunction with the rotatable table section are that the stationary table section prevents the weight of the cullet from falling and causing chipping of the glass and, further, that it is also useful in discarding the cullet by permitting the operator to raise the loosened cullet at the front of the table and push it back over the table into the cullet box. It has been found that with this type of cutting table, it is possible for an operator to cut considerably more glass per unit of time than on a solid top stationary table.

The cutting table herein provided is of advantage not only in the cutting of discs or circular sections but likewise in the cutting of large odd shaped glass for mirrors. It will of course be appreciated that when cutting out different shapes, different forms of cutting means may be employed.

It is to be understood that the form of the invention herewith shown and described is to be taken as the preferred embodiment of the same, and that various changes in the shape, size and arrangement of parts may be resorted to without departing from the spirit of the invention or the scope of the subjoined claims.

I claim:

1. In a cutting table for sheet glass or the like, a stationary section provided with a flat stationary top having a substantially U-shaped opening therein, a revolving section having a flat rotating top located in said opening, the glass sheet to be cut being supported upon said rotating top and overlying said stationary top, and means for moving said rotating top backwardly and forwardly within the substantially U-shaped opening in said stationary top.

2. In a cutting table for sheet glass or the like, a stationary section provided with a flat stationary top having a substantially U-shaped opening therein, a revolving section having a flat rotating top located in said opening and positioned at a relatively higher level than the stationary top, the glass sheet to be cut being supported upon said rotating top and overlying said stationary top, and means for moving said rotating top backwardly and forwardly within the substantially U-shaped opening in said stationary top.

LEON I. LOUVIAUX.